(12) United States Patent
Tecu et al.

(10) Patent No.: US 9,092,165 B2
(45) Date of Patent: *Jul. 28, 2015

(54) PRINTING AN ELECTRONIC DOCUMENT USING A PRINTER AND A MOBILE DEVICE

(75) Inventors: Kirk Steven Tecu, Longmont, CO (US); Mabry Frazier Dozier, III, Lafayette, CO (US); Stuart L. M. Guarnieri, Laramie, WY (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 522 days.

This patent is subject to a terminal disclaimer.

(21) Appl. No.: 13/363,336

(22) Filed: Jan. 31, 2012

(65) Prior Publication Data
US 2013/0194623 A1 Aug. 1, 2013

(51) Int. Cl.
*G06F 3/12* (2006.01)
(52) U.S. Cl.
CPC ............ *G06F 3/1204* (2013.01); *G06F 3/1268* (2013.01); *G06F 3/1288* (2013.01); *G06F 3/1292* (2013.01); *G06F 3/1222* (2013.01); *G06F 3/1267* (2013.01)

(58) Field of Classification Search
None
See application file for complete search history.

(56) References Cited

U.S. PATENT DOCUMENTS

| | | | |
|---|---|---|---|
| 7,006,242 B2 | 2/2006 | Smith, II et al. | |
| 7,616,337 B2 | 11/2009 | Hayashi | |
| 7,830,539 B2 | 11/2010 | Yajima et al. | |
| 2007/0103703 A1* | 5/2007 | Matoba | 358/1.6 |
| 2010/0309510 A1 | 12/2010 | Hansen | |
| 2011/0085196 A1 | 4/2011 | Liu et al. | |
| 2012/0008161 A1 | 1/2012 | Rouhana | |
| 2012/0069386 A1 | 3/2012 | St. Laurent et al. | |
| 2012/0206751 A1 | 8/2012 | Bradshaw et al. | |
| 2012/0250065 A1 | 10/2012 | Partridge et al. | |
| 2013/0021638 A1* | 1/2013 | Hong et al. | 358/1.14 |
| 2013/0148145 A1* | 6/2013 | Salgado | 358/1.13 |

FOREIGN PATENT DOCUMENTS

| | | | |
|---|---|---|---|
| JP | 11149354 | * | 6/1999 |
| JP | 2004252677 | * | 9/2004 |

\* cited by examiner

*Primary Examiner* — Fan Zhang
(74) *Attorney, Agent, or Firm* — Osha·Liang LLP

(57) ABSTRACT

A method for printing an electronic document (ED) using a printer and a mobile device, including: receiving, by the printer, a request to print; generating, by the printer, a unique identifier (UID) in response to the request, where the mobile device sends a print job associated with the UID and the ED to a print server over a network; sending, by the printer, the UID to the print server; receiving, by the printer, the print job from the print server in response to sending the UID; and printing, by the printer, a hardcopy of the ED based on the print job.

22 Claims, 6 Drawing Sheets

PRINTING AN ELECTRONIC DOCUMENT USING A PRINTER AND A MOBILE DEVICE

CROSS-REFERENCE TO RELATED APPLICATIONS

The present application contains subject matter that may be related to the subject matter in the U.S. application with the Ser. No. 13/249,701, entitled "Wireless Printing from a Device Outside the Network", filed on Sep. 30, 2011, and assigned to the assignee of the present application.

BACKGROUND

In order to print an electronic document (ED) from a mobile device on a printer in a traditional network environment, all printers attached to a print server in the network would have to be exposed as available printing devices to the mobile device that wants to print the document. In a large corporate environment, this would expose many printers across the globe as available printing devices for a mobile device. The exposure of this information in this manner is not practical from a security standpoint.

SUMMARY

In general, in one aspect, the invention relates to a method for printing an electronic document (ED) using a printer and a mobile device. The method comprises: receiving, by the printer, a request to print; generating, by the printer, a unique identifier (UID) in response to the request, wherein the mobile device sends a print job associated with the UID and the ED to a print server over a first network; sending, by the printer, the UID to the print server; receiving, by the printer, the print job from the print server in response to sending the UID; and printing, by the printer, a hardcopy of the ED based on the print job.

In general, in one aspect, the invention relates to a method for printing an electronic document (ED) using a printer and a mobile device. The method comprises: obtaining, by the mobile device, a unique identifier (UID) generated by the printer; receiving, by the mobile device and after obtaining the UID, a selection of the ED from a user of the mobile device; and sending, by the mobile device, a print job associated with the ED and the UID to a print server over a first network, wherein the print server sends the print job to the printer in response to matching the print job with the UID received from the printer; and wherein the printer generates a hardcopy of the ED based on the print job.

In general, in one aspect, the invention relates to a method for printing an electronic document (ED) using a printer and a mobile device. The method comprises: obtaining, by a print server and from the mobile device over a first network, a print job associated with a unique identifier (UID) and the ED, wherein the mobile device obtains the UID from the printer; obtaining, by the print server, the UID from the printer over a second network, wherein the printer generated the UID in response to a request to print; matching, by the print server, the UID from the printer and the print job from the mobile device; and sending, by the print server and in response to matching, the print job to the printer over the second network, wherein the printer generates a hardcopy of the ED based on the print job.

In general, in one aspect, the invention relates to a non-transitory computer readable medium (CRM) storing instructions for printing an electronic document (ED). The instructions comprise functionality to: receive, using a printer, a request to print; generate, using the printer, a unique identifier (UID) in response to the request, wherein the mobile device sends a print job associated with the UID and the ED to a print server over a first network; send, using the printer, the UID to the print server; receive, using the printer, the print job from the print server in response to sending the UID; and print, using the printer, a hardcopy of the ED based on the print job.

In general, in one aspect, the invention relates to a non-transitory computer readable medium (CRM) storing instructions for printing an electronic document (ED). The instructions comprising functionality to: obtain, using a print server and from a mobile device over a first network, a print job associated with a unique identifier (UID) and the ED; obtain, using the print server, the UID from a printer over a second network, wherein the mobile device obtains the UID from the printer, and wherein the printer generated the UID in response to a request to print; match, using the print server, the UID from the printer and the print job from the mobile device; and send, using the print server and in response to matching the UID and the print job, the print job to the printer over the second network, wherein the printer generates a hardcopy of the ED based on the print job.

In general, in one aspect, the invention relates to a system for printing an electronic document (ED). The system comprises: a printer configured to generate a unique identifier (UID) in response to a request to print; a mobile device configured to obtain the UID and generate a print job associated with the UID and the ED; a print server configured to receive the print job from the mobile device over a first network and send, in response to receiving the UID from the printer, the print job to the printer, wherein the printer prints the ED after receiving the print job from the print server.

Other aspects of the invention will be apparent from the following description and the appended claims.

DETAILED DESCRIPTION

Figure 1:
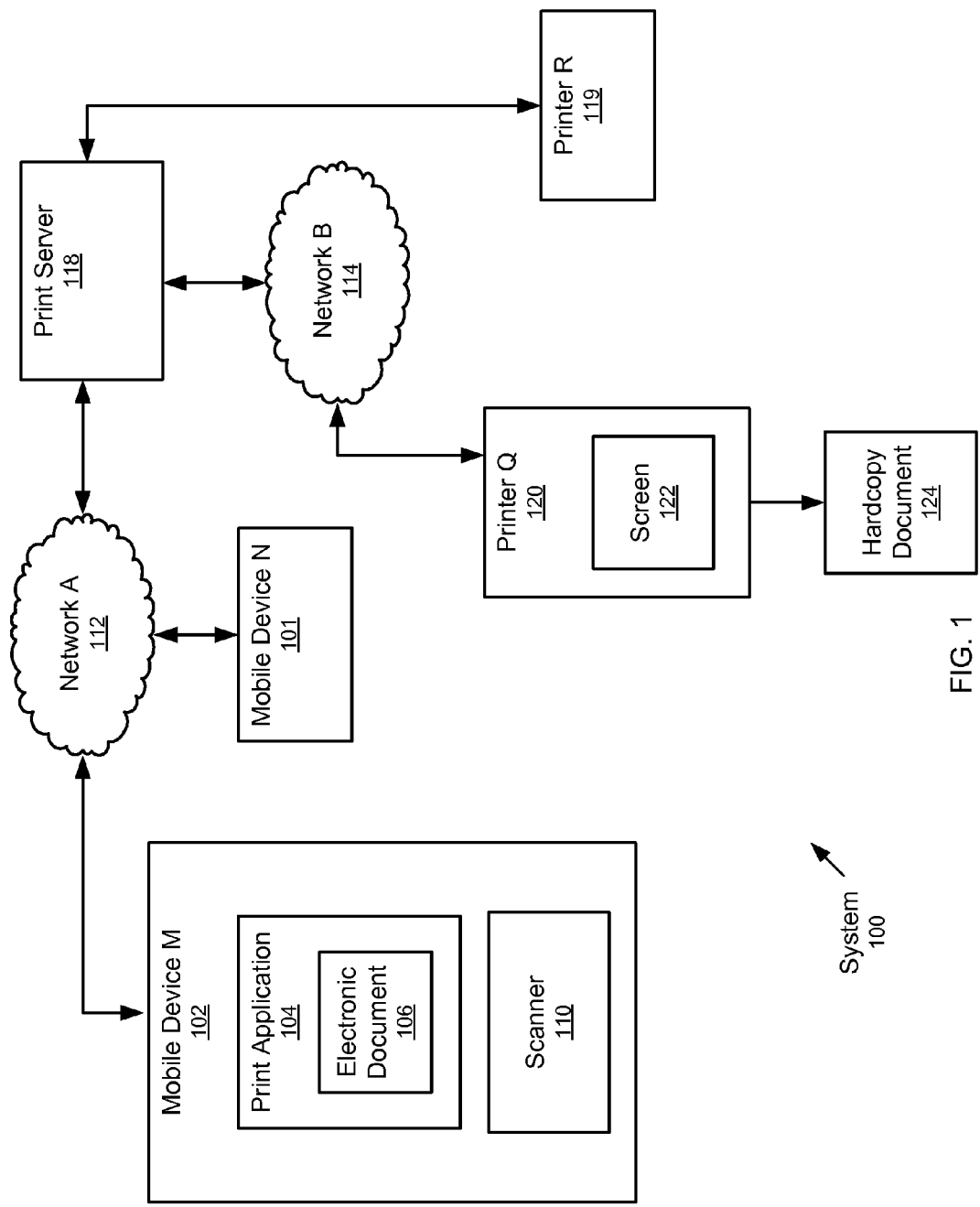
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and/or method for printing an ED using a printer and a mobile device. Specifically, the mobile device obtains a unique identifier (UID) generated by the printer. The mobile device sends a print job associated with both the UID and the ED to a print server (e.g., via a cellular network). The printer also sends the UID to the print server (e.g., via a secure network). In response to matching the UID received from the printer with the print job received from the mobile device, the print server sends the print job to the printer to print the ED.

FIG. 1 shows a system (100) in accordance with one or more embodiments of the invention. As shown in FIG. 1, the system (100) has multiple components including one or more mobile devices (i.e., Mobile Device N (101), Mobile Device M (102)), a print server (118), and one or more printers (i.e., Printer R (119), Printer Q (120)). These components are described below and may be located on the same hardware device (e.g. a server, mainframe, desktop Personal Computer (PC), laptop, Personal Digital Assistant (PDA), printer, telephone, smart mobile phone, kiosk, cable box, tablet, e-reader, or any other hardware device) or may be located on separate devices connected by networks (e.g. the Internet, a wide area network (WAN), or a local area network (LAN), cellular network, etc.), with wired and/or wireless segments.

In one or more embodiments of the invention, the printer Q (120) is configured to generate a UID and a graphical code including (e.g., embedding, encrypting, encoding, etc.) the UID. The graphical code may be a 1D barcode, a 2D barcode (e.g., a quick response (QR) code), a dataglyph, an image, plain text, etc. The UID and graphical code may be generated by the printer Q (120) in response to a request to print. The printer Q (120) may include a screen (122) for displaying the graphical code. The screen (122) may be a liquid crystal display (LCD). The printer Q (120) may also be configured to print the graphical code on a medium (e.g., paper, transparency, microfilm, microfiche, etc.). In one or more embodiments of the invention, printer Q (120) is a multifunction printer (MFP) and has faxing, emailing, and/or scanning functionalities in addition to printing capabilities.

In one or more embodiments of the inventions, the printer Q (120) is configured to send the UID to the print server (118). The printer Q (120) may also be configured to receive a print job corresponding to the UID from the print server (118) in response to sending the UID. In other words, the printer Q (120) may send the UID to the print server (118) as part of a request for the corresponding print job. The printer Q (120) may generate a hardcopy document (124) based on the print job received from the print server (118).

In one or more embodiments of the invention, the mobile device M (102) has a scanner (110). The scanner (110) may have functionality to obtain a graphical code. The scanner (110) may obtain the graphical code from a screen (e.g., a liquid crystal display (LCD) screen, a plasma screen, etc.) displaying the graphical code, or from a medium (e.g., paper, transparency, microfiche, microfilm, etc.) having the graphical code. Accordingly, the scanner (110) may be a camera or a barcode laser. The mobile device M (102) may also include functionality to extract a UID from the acquired/obtained graphical code (discussed below).

In one or more embodiments of the invention, the mobile device M (102) executes a print application (104). The print application (104) may be executed in response to a request from the user of the mobile device M (102) to print. The print application (104) may include one or more graphical user interfaces (GUIs) allowing the user to select the ED (106) for printing. The ED (106) may be, for example, a word processing document, a PDF document, a spreadsheet, an image, forms, one or more slides, etc. Although FIG. 1 shows the ED (106) as being stored on the mobile device M (102), the ED (106) may be stored remotely. In one or more embodiments of the invention, the print application (104) is configured to generate a print job associated with both the UID obtained using the scanner (110), and the ED (106) selected by the user. In one or more embodiments of the invention, execution of the print application (104) may activate the scanner (110). The mobile device M (102) may send the print job to the print server (118). In one or more embodiments of the invention, the UID may also identify the print server (e.g., the MAC address of the print server, the IP address of the print server, etc.). The mobile device M (102) may use this information to send the print job to the print server.

In one or more embodiments of the invention, the print server (118) manages the print jobs destined for printing on one or more of the printers (119, 120). Specifically, the print server (118) is configured to match the UID in a request from a printer (119, 120), with the corresponding print job received from a mobile device (101, 102). In one or more embodiments of the invention, matching requires parsing print jobs and requests from printers (119, 120) to identify and compare the UIDs. The print server (118) may be also be configured to send the corresponding print job to the requesting printer (119, 120).

In one or more embodiments of the invention, the UID expires after a pre-determined amount of time (e.g., 30 seconds, 5 minutes, 30 minutes, 1 hour, etc.). Once the UID expires, it is considered invalid and the print server (118) might ignore any print requests and/or print jobs corresponding to the UID.

As shown in FIG. 1, network A (112) operatively connects the mobile devices (101, 102) with the print server (118). The network A (112) may be a cellular network. As also shown in FIG. 1, network B (114) operatively connects printer Q (120) with the print server (118). The network B (114) may be a secure enterprise network. In one or more embodiments of the invention, the print server (118) is a desktop PC, and the printer Q (120) is operatively connected to the print server (118) by a USB connection or home network.

Figure 2A:
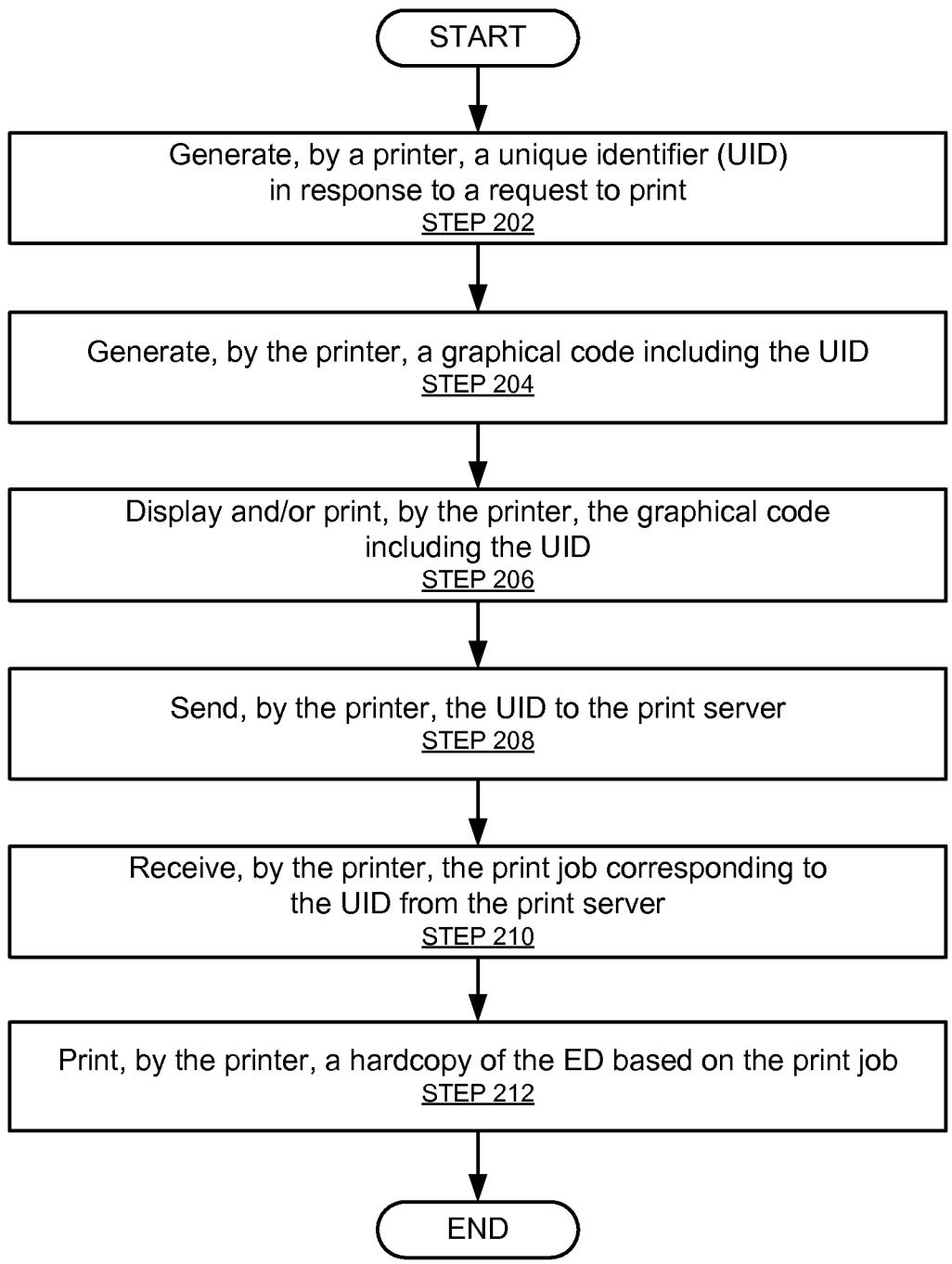
FIGS. 2A, 2B, and 2C show flowcharts in accordance with one or more embodiments of the invention.

FIG. 2A shows a flowchart in accordance with one or more embodiments of the invention. One or more steps of the process in FIG. 2A may be executed by the system (100) (e.g., Printer Q (120)) to print an ED. The sequence of steps shown in FIG. 2A may differ among embodiments of the invention, and one or more of the steps may be performed in parallel and/or may be optional. Moreover, one or more steps in FIG. 2A may be repeated. Accordingly, the scope of the invention should not be considered limited to the specific arrangement of steps shown in FIG. 2A.

In STEP 202, a unique identifier (UID) is generated by a printer. The UID may be generated in response to a request received by the printer to print. The UID may be based on a time stamp corresponding to when the request was received. The UID may be based on the media access control (MAC) address of the printer. The UID may be based a globally unique identifier (GUID) of any size and generated using any algorithm.

In STEP 204, a graphical code including the UID is generated by the printer. The graphical code may be, for example, a 1D barcode, a 2D barcode (e.g., a quick response (QR) code), a dataglyph, an image, plain text, etc. that includes the UID.

In STEP 206, the printer displays the graphical code on the screen of the printer. If the printer does not have a screen, the printer may print the graphical code on a medium (e.g., paper, transparency, microfilm, microfiche, etc.).

In STEP 208, the printer sends the UID to a print server. In one or more embodiments of the invention, the UID identifies the location of the print server. In one or more embodiments of the invention, the location of the print server is already known to the printer. The printer may send the UID to the print server over an enterprise secure network. The UID may be sent to the print server as part of a request for the print job corresponding to the UID. STEP 206 may be performed at any time after the UID is generated. In other words, the printer may send the UID to the print server before the graphical code is generated, displayed, and/or printed (i.e., before STEP 204 or STEP 206).

In STEP 210, the printer receives the print job corresponding to the UID from the print server. The printer may receive the print job over the enterprise secure network.

In STEP 212, a hardcopy of the ED is printed based on the print job. The hardcopy is one or more physically printed pages of the ED. The hardcopy may be printed according to the information in the print job. For example, the print job may specify that the hardcopy be printed with specific fonts, sizes, margins, characters, and so forth.

Figure 2B:
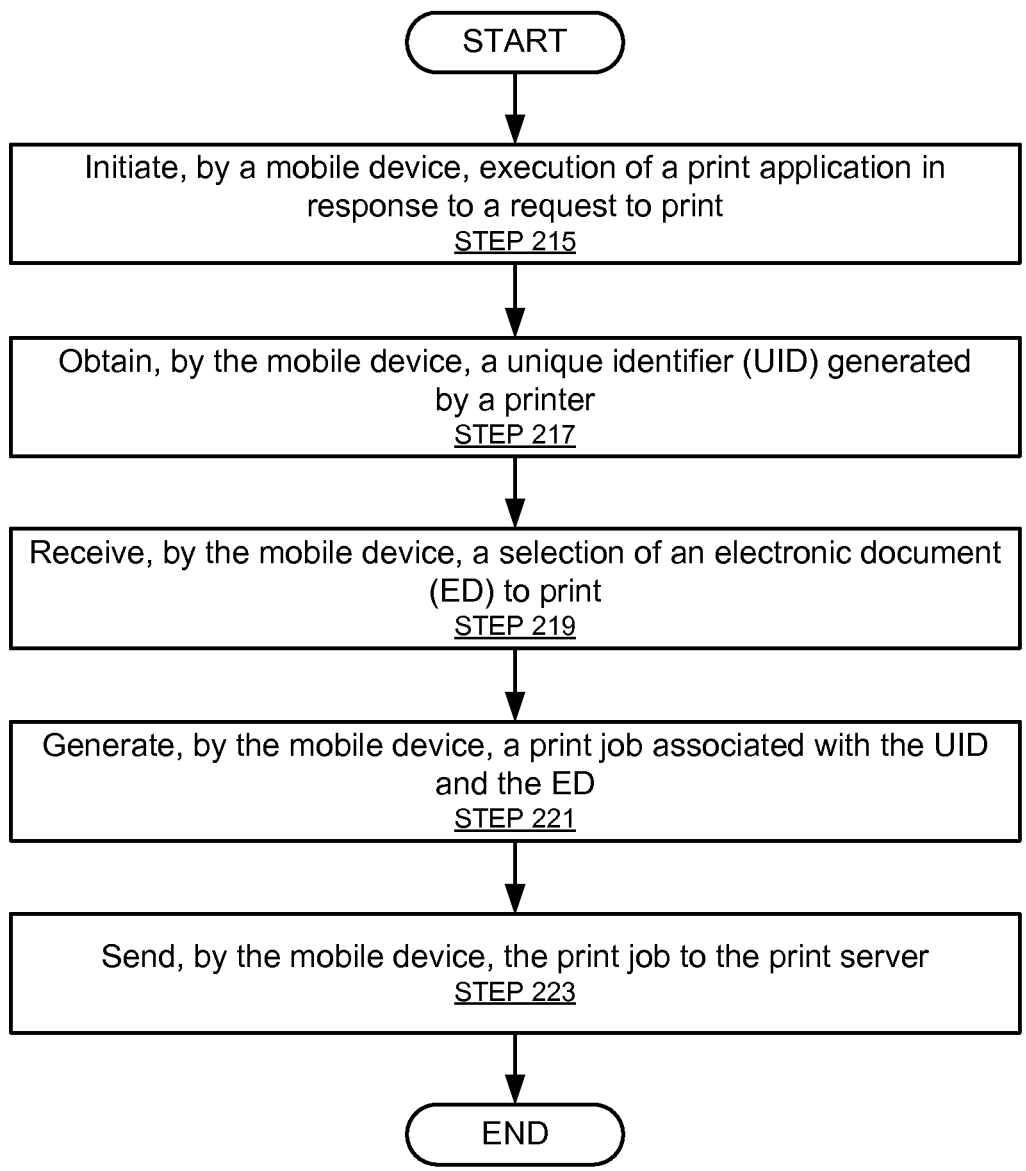

FIG. 2B shows a flowchart in accordance with one or more embodiments of the invention. One or more steps of the process in FIG. 2B may be executed by the system (100) (e.g., Mobile Device M (102)) to print an ED. The sequence of steps shown in FIG. 2B may differ among embodiments of the invention, and one or more of the steps may be performed in parallel and/or may be optional. Moreover, one or more steps in FIG. 2B may be repeated. Accordingly, the scope of the invention should not be considered limited to the specific arrangement of steps shown in FIG. 2B.

In STEP 215, a mobile device initiates execution of a print application.

The mobile device may initiate execution of the print application in response to a user request to print. In one or more embodiments of the invention, execution of the print application activates the scanner (e.g., camera, barcode laser, etc.) of the mobile device.

In STEP 217, a unique identifier (UID) is obtained by the mobile device. For example, the mobile device may obtain the UID by photographing a graphical code including the UID and displayed on the screen of a printer or printed by the printer on the medium. The UID may then be extracted from the resulting image (e.g., by the print application). As another example, the mobile device may use its barcode laser to scan the graphical code and extract the UID. As yet another example, the UID may be transmitted wirelessly (e.g., via infrared, Bluetooth, etc.) from the printer to the mobile device.

In STEP 219, the mobile device receives a selection of an ED for printing. In one or more embodiments of the invention, the print application includes one or more GUIs allowing the user of the mobile device to select the ED for printing. The ED may be stored on the mobile device. The ED may be stored at a remote location accessible to the mobile device.

In STEP 221, a print job associated with the UID and the ED is generated by the mobile device. The print job may be generated by the print application executing on the mobile device. For example, the print job may include a print ticket that identifies the UID. As another example, the print job may include the contents of the ED for printing. As yet another example, the print job may identify a remote location storing the ED.

In STEP 223, the mobile device sends the print job to a print server. In one or more embodiments of the invention, the UID identifies the location of the print server. In one or more embodiments of the invention, the location of the print server is already known to the print application. The print job may be sent to the print server via, for example, a public cellular or wireless network. The print job may be secured during transmission over the public network by encryption or other similar means.

Figure 2C:
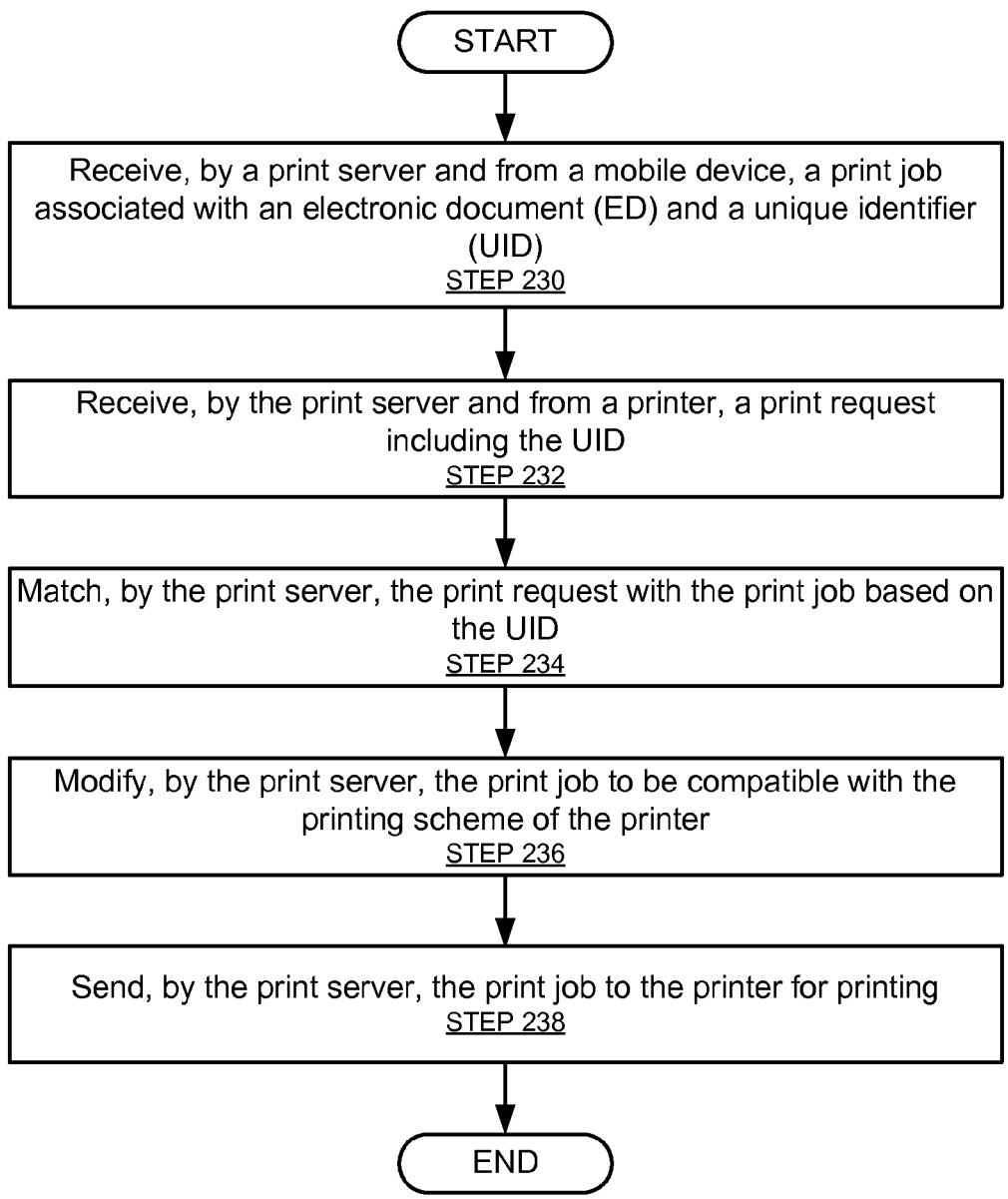

FIG. 2C shows a flowchart in accordance with one or more embodiments of the invention. One or more steps of the process in FIG. 2C may be executed by the system (100) (e.g., Print Server (118)) to print an ED. The sequence of steps shown in FIG. 2C may differ among embodiments of the invention, and one or more of the steps may be performed in parallel and/or may be optional. Moreover, one or more steps in FIG. 2C may be repeated. Accordingly, the scope of the invention should not be considered limited to the specific arrangement of steps shown in FIG. 2C.

In STEP 230, a print server receives a print job from a mobile device. The print job may be received over a cellular network. Moreover, the print job is associated with both a unique identifier (UID) and the ED to be printed. For example, the print job may include a print ticket that identifies the UID. As another example, the print job may include the contents of the ED for printing. As yet another example, the print job may identify a remote location storing the ED.

In STEP 232, the print server receives a UID from a printer. The UID may be part of a print request received from the printer. Moreover, the print server may receive the UID from the printer over an enterprise secure network (i.e., a different network than the network used to transmit the print job to the print server). In one or more embodiments of the invention, STEP 232 may be performed before STEP 230. In other words, the print server may receive the UID from the printer before the print server receives the print job from the mobile device.

In STEP 234, the print server matches the UID received from the printer with the corresponding print job received from the mobile device. In one or more embodiments of the invention, matching requires parsing the request received from the printer and the print job received from the mobile device to identify and compare the UID(s). Those skilled in the art, having the benefit of this detailed description, will appreciate that the print server may be storing any number of print jobs, and it may be necessary to parse all of the print jobs in order to find the print job corresponding to the UID received from the printer. Similarly, the print server may be storing any number of print requests from any number of printers.

In STEP 236, the print server modifies, if necessary, the print job corresponding to the UID to be compatible with the printing scheme supported by the printer, and sends the (modified) print job to the printer. For example, if the print job stored in the print server includes an ED described/represented using a document markup language (e.g., OOXML), and if the requesting printer only supports a PDL printing scheme, the print server may generate a plurality of PDL commands/instructions including various print objects (e.g., text objects, graphic objects, image objects) and control objects (e.g., blend and transparency commands, color management information) from the ED described/represented using the document markup language. As discussed above, the request received by the print server may identify the printing scheme(s) supported by the requesting printer. Alternatively, the print server may include a lookup table or directory recording the printing scheme(s) supported by various printers.

In STEP 238, the print server sends the print job to the printer for printing. The print server may send the print job to the printer over the enterprise secure network.

Figure 3:
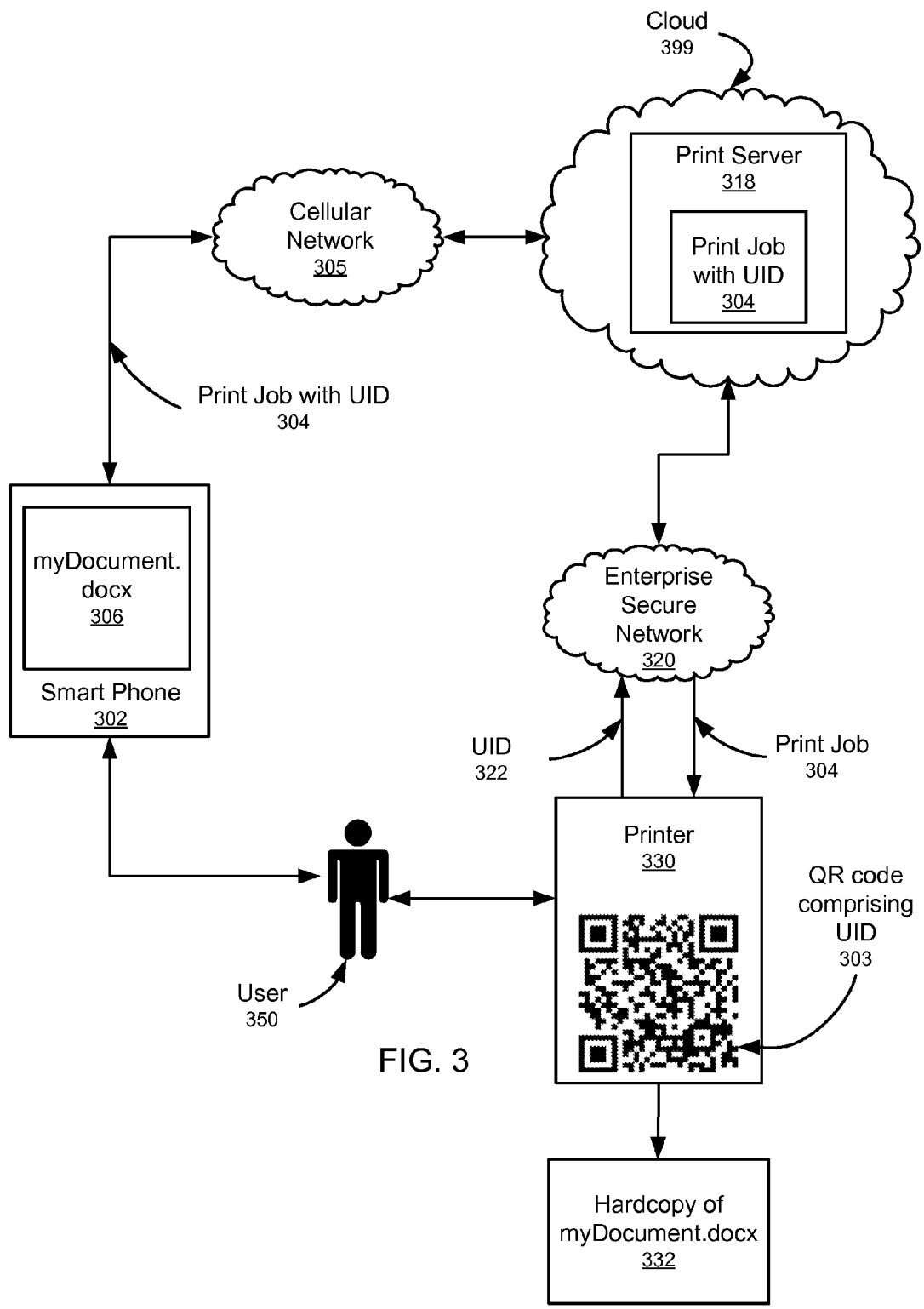
FIG. 3 shows an example in accordance with one or more embodiments of the invention.

FIG. 3 shows an example in accordance with one or more embodiments of the invention. As shown in FIG. 3, there exists a user (350), a smart phone (302), a printer (330), and a print server (318). The print server (318) and the smart phone (302) are operatively connected by the cellular network (305). The printer (330) and the print server (318) are operatively connected by the enterprise secure network (320). The printer (330) includes a LCD screen and the smart phone (302) includes a camera.

Still referring to FIG. 3, the printer (330) receives a request to print from the user (350). The user (350) may execute the request by selecting one or more buttons on a control panel of the printer (330). In response to receiving the request to print from the user (350), the printer (330) generates and displays a QR code comprising a unique identifier (UID) (303) on the LCD screen of the printer (330). The UID may be a combination of a time stamp, a random string, and the MAC address of the MFP (330). The UID may also identify the print server (318). The printer (330) then sends the UID (322) to the print server (318) via the enterprise secure network (320) as part of a request for the print job corresponding to the UID (322).

The user (350) then initiates a print application on the smart phone (302). The print application activates the camera on the smart phone (302) allowing the user (350) to photograph the QR code (303) being displayed on the LCD screen of the printer (330). The print application extracts the UID from the QR code (303) captured by the camera of the smart phone (302). Then, the print application prompts the user (350) to associate one or more files with the UID (e.g. myDocument.docx (306)) via one or more GUIs. MyDocument.docx (306) may be stored on the smart phone (302), or at a remote network location accessible by the smart phone (302) (e.g. in a repository accessible via the Internet). The print application of the smart phone (302) then generates and submits a print job (304) to the print server (318). The print job (304) includes the file and a print ticket with the UID to identify the print job to the print server (318). The following is an example print ticket for the print job (304):

%-12345X@PJL JOB
    @PJL COMMENT
    @PJL SET USERNAME="JSmith"
    @PJL SET DATESTAMP="20120119"
    @PJL SET PLANESINUSE=3
    @PJL SET JOBNAME="MyDocument.docx"
    @PJL SET PAPER=LETTER
    @PJL SET MEDIATYPE=PAPER
    @PJL SET HOLD=OFF
    @PJL SET TRAYCHAIN=YES
    @PJL SET ECONOMODE=OFF
    @PJL SET BITSPERPIXEL=4
    @PJL SET COPIES=1
    @PJL SET TRAYMAPPING=OFF
    @PJL SET COLORMATCHING=YES
    @PJL SET RECTOUTMODE=ON
    @PJL SET OSTYPE=1
    @PJL SET DRVVERSION="1.0.15.0"
    @PJL SET DRVLANGUAGE=1
    @PJL ENTER LANGUAGE=PCLXL
    @PJL SET PSCLOUDPRINTJOB=123
    @PJL SET PSCLOUDMAC=FF:FF:FF:FF:FF:FF
    @PJL SET PSCLOUDTIME=12:30:25

Many lines in the print ticket are commands to set print job properties such as paper size and copy count. However, the last three lines may correspond to components of the UID (e.g., MAC address of the printer (330), time stamp, and a random string) and identify the print job (304) to the print server (318).

The print job (304) may be submitted to the print server (318) by the smart phone (302) via the cellular network (305). Specifically, the cellular network (305) is a different network than the enterprise secure network (320) that the printer (330) utilizes to communicate with the print server (318). The print server (318) may reside in a cloud (399) network architecture.

The print server (318) compares the UID (322) received from the printer (330) with the UIDs in the print jobs received from the mobile device(s). The print server (318) sends the print job (304) with the matching UID to the printer (330) via the enterprise secure network (320). The printer (330) then generates a hardcopy (332) of myDocument.docx according to the instructions in the print job.

Embodiments of the invention may have one or more of the following advantages: a wireless mobile device printing to a local printer is not required to be on the same network as the printer; the printer network information does not have to be exposed to the wireless device user; a print job is physically tied to the local printer and wireless network device. Further, erroneous print jobs cannot be submitted to a printer if the user is not physically present at the printer to obtain the UID. Finally, a user may quickly submit a print job with minimal input into a mobile application on a mobile device and/or printer user interface.

Figure 4:
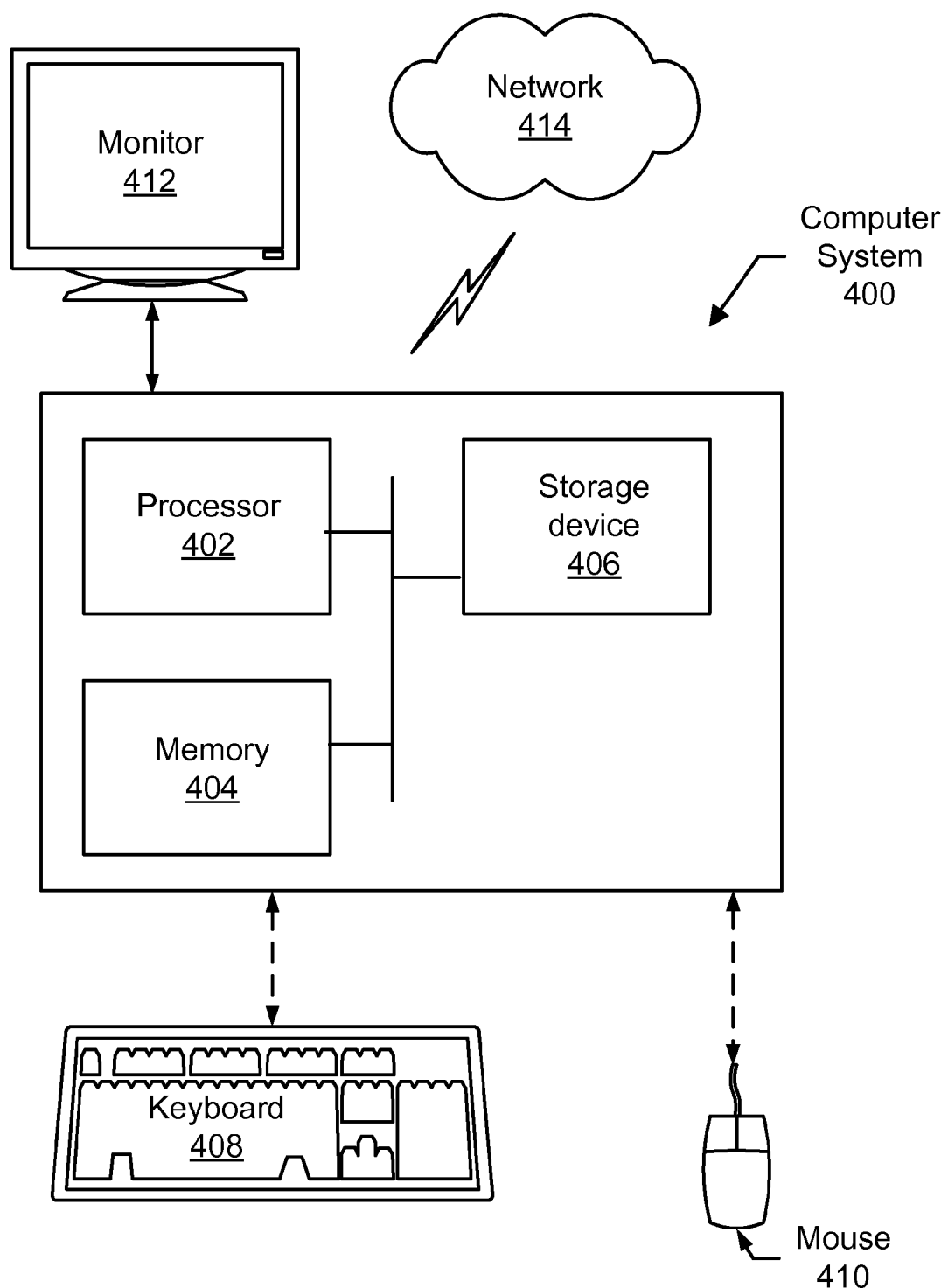
FIG. 4 shows a computer system in accordance with one or more embodiments of the invention.

Embodiments of the invention may be implemented on virtually any type of computer regardless of the platform being used. For example, as shown in FIG. 4, a computer system (400) includes one or more processor(s) (402), an associated memory (404) (e.g. random access memory (RAM), cache memory, flash memory, etc.), a storage device (406) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (402) is hardware. For example, the processor may be an integrated circuit. The computer system (400) may also include input means, such as a keyboard (408), a mouse (410), or a microphone (not shown). Further, the computer system (400) may include output means, such as a monitor (412) (e.g. a liquid crystal display (LCD), a plasma display, or cathode ray tube (CRT) monitor). The computer system (400) may be connected to a network (414) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (400) includes at least the minimal processing, input, and/or output means necessary to practice embodiments of the invention.

Further, in one or more embodiments of the invention, one or more elements of the aforementioned computer system (400) may be located at a remote location and connected to the other elements over a network. Further, embodiments of the invention may be implemented on a distributed system having a plurality of nodes, where each portion of the invention (e.g. mobile device, user application, print server, multifunction printer) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for printing an electronic document (ED) using a printer and a mobile device, comprising:
    receiving, by the printer, a request to print from a user of the mobile device;
    dynamically generating, by the printer, a unique identifier (UID) in response to the request, wherein different UIDs are generated by the printer in response to different requests to print;
    providing, by the printer, the UID to the mobile device, wherein the mobile device sends a print job associated with the ED and comprising the UID to a print server over a first network, and wherein the UID comprises at least one selected from a group consisting of a MAC address of the print server and an IP address of the print server;
    sending, by the printer, the UID to the print server, wherein the print server matches the UID received from the printer with the UID in the print job received from the mobile device, wherein the UID expires after a predetermined amount of time, and wherein the print server ignores any print jobs corresponding to the UID after the UID expires;
    receiving, by the printer, the print job from the print server in response to sending the UID, wherein the UID is dynamically generated by the printer before the printer receives the print job from the print server; and
    printing, by the printer, a hardcopy of the ED based on the print job.

2. The method of claim 1, wherein providing the UID to the mobile device comprises:
    printing, by the printer, a graphical code comprising the UID on a medium, wherein the mobile device obtains the UID by photographing the medium.

3. The method of claim 1, wherein providing the UID to the mobile device comprises:
    displaying a graphical code comprising the UID on a screen of the printer, wherein the mobile device obtains the UID by scanning the screen displaying the graphical code.

4. The method of claim 3, wherein the graphical code is a two-dimensional barcode.

5. The method of claim 1, wherein the printer sends the UID to the print server over a second network, and wherein the printer receives the print job from the print server over the second network.

6. The method of claim 5, wherein the first network is a public cellular network, and wherein the second network is a secure network.

7. The method of claim 1, wherein the ED is selected by the user of the mobile device, wherein the print job is generated by the mobile device after the ED is selected by the user, and wherein the print job comprises a print ticket including the UID.

8. A method for printing an electronic document (ED) using a printer and a mobile device, comprising:
    obtaining, by the mobile device, a unique identifier (UID) dynamically generated by the printer in response to a request to print from a user of the mobile device, wherein different UIDs are generated by the printer in response to different requests to print;
    receiving, by the mobile device and after obtaining the UID, a selection of the ED from the user of the mobile device; and
    sending, by the mobile device, a print job associated with the ED and comprising the UID to a print server over a first network,
    wherein the UID comprises at least one selected from a group consisting of a MAC address of the print server and an IP address of the print server,
    wherein the printer sends the UID to the print server,
    wherein the print server sends the print job to the printer in response to matching the UID in the print job with the UID received from the printer,
    wherein the UID expires after a predetermined amount of time,
    wherein the print server ignores any print jobs corresponding to the UID after the UID expires,
    wherein the printer dynamically generates the UID before the printer receives the print job from the print server, and
    wherein the printer generates a hardcopy of the ED based on the print job.

9. The method of claim 8, wherein the printer sends the UID to the print server over a second network, and wherein the print server sends the print job to the printer over the second network.

10. The method of claim 8, wherein obtaining the UID comprises:
    photographing, by the mobile device, a screen of the printer displaying a graphical code comprising the UID; and
    extracting, by the mobile device, the UID from the graphical code.

11. A method for printing an electronic document (ED) using a printer and a mobile device, comprising:
    obtaining, by a print server and from the mobile device over a first network, a print job associated with the ED and comprising a unique identifier (UID),
    wherein the mobile device obtains the UID from the printer, and
    wherein the UID comprises at least one selected from a group consisting of a MAC address of the print server and an IP address of the print server;
    obtaining, by the print server, the UID from the printer over a second network, wherein the printer dynamically generated the UID in response to a request from a user of the mobile device to print, wherein different UIDs are generated by the printer in response to different requests to print;
    matching, by the print server, the UID from the printer and the UID in the print job from the mobile device; and
    sending, by the print server and in response to matching, the print job to the printer over the second network,
    wherein the UID expires after a predetermined amount of time,
    wherein the print server ignores any print jobs corresponding to the UID after the UID expires,
    wherein the printer dynamically generates the UID before the printer server receives the print job from the print server, and
    wherein the printer generates a hardcopy of the ED based on the print job.

12. The method of claim 11, wherein the print job comprises a print ticket identifying the UID.

13. A non-transitory computer readable medium (CRM) storing instructions for printing an electronic document (ED), the instructions comprising functionality to:

receive, using a printer, a request to print from a user of a mobile device;
dynamically generate, using the printer, a unique identifier (UID) in response to the request,
wherein different UIDs are generated by the printer in response to different requests to print, and
wherein the UID comprises at least one selected from a group consisting of a MAC address of the print server and an IP address of the print server;
provide, using the printer, the UID to the mobile device, wherein the mobile device sends a print job associated with the ED and comprising the UID to a print server over a first network;
send, using the printer, the UID to the print server, wherein the print server matches the UID received from the printer with the UID in the print job received from the mobile device, wherein the UID expires after a predetermined amount of time, and wherein the print server ignores any print lobs corresponding to the UID after the UID expires;
receive, using the printer, the print job from the print server in response to sending the UID, wherein the UID is dynamically generated by the printer before the printer receives the print job from the print server; and
print, using the printer, a hardcopy of the ED based on the print job.

14. The non-transitory CRM of claim 13, wherein the UID is sent to the print server over a second network, and wherein the print job is received from the print server over the second network.

15. The non-transitory CRM of claim 13, wherein the instructions to provide the UID to the mobile device comprise functionality to:
print, using the printer, a graphical code comprising the UID on a medium, wherein the mobile device obtains the UID by scanning the medium.

16. A non-transitory computer readable medium (CRM) storing instructions for printing an electronic document (ED), the instructions comprising functionality to:
obtain, using a print server and from a mobile device over a first network, a print job associated with the ED and comprising a unique identifier (UID);
obtain, using the print server, the UID from a printer over a second network,
wherein the UID comprises at least one selected from a group consisting of a MAC address of the print server and an IP address of the print server,
wherein the mobile device obtains the UID from the printer,
wherein the UID expires after a predetermined amount of time,
wherein the print server ignores any print lobs corresponding to the UID after the UID expires,
wherein the printer dynamically generated the UID in response to a request from a user of the mobile device to print, and
wherein different UIDs are generated by the printer in response to different requests to print;
match, using the print server, the UID from the printer and the UID in the print job from the mobile device; and
send, using the print server and in response to matching the UID from the printer and the UID in the print job, the print job to the printer over the second network,
wherein the UID is dynamically generated by the printer before the printer receives the print job from the print server, and
wherein the printer generates a hardcopy of the ED based on the print job.

17. The non-transitory CRM of claim 16, wherein the print job comprises a print ticket identifying the UID.

18. A system for printing an electronic document (ED), comprising:
a printer configured to dynamically generate a unique identifier (UID) in response to a request to print from a user, wherein different UIDs are generated by the printer in response to different requests to print;
a mobile device operated by the user and configured to obtain the UID from the printer and generate a print job associated with the ED and comprising the UID; and
a print server configured to receive the print job from the mobile device over a first network and send, in response to receiving the UID from the printer, the print job to the printer,
wherein the UID is dynamically generated by the printer before the printer receives the print job from the print server,
wherein the UID expires after a predetermined amount of time,
wherein the print server ignores any print lobs corresponding to the UID after the UID expires,
wherein the UID comprises at least one selected from a group consisting of a MAC address of the print server and an IP address of the print server, and
wherein the printer prints the ED after receiving the print job from the print server.

19. The system of claim 18, wherein the print server receives the UID from the printer over a second network, and wherein the print server sends the print job to the printer over the second network.

20. The system of claim 19, wherein the first network is a cellular network, and wherein the second network is a secure network.

21. The system of claim 18, wherein the printer is further configured to display a graphical code comprising the UID on a screen of the printer, and wherein the mobile device obtains the UID by scanning the screen displaying the graphical code.

22. The system of claim 18, wherein the printer is connected to the print server by a universal serial bus (USB) connection, and wherein the print server is a personal computer (PC).

* * * * *